Patented Nov. 8, 1949

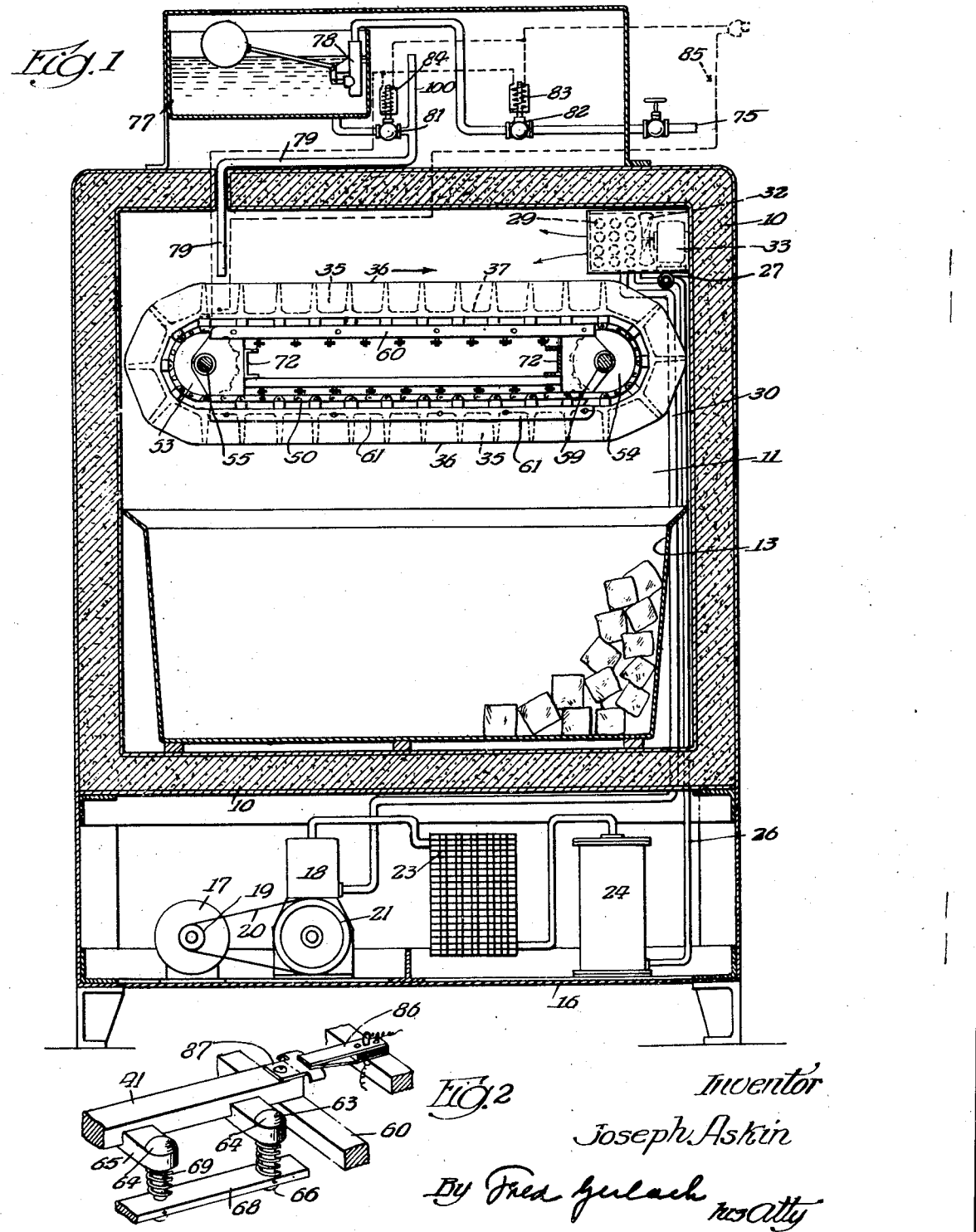

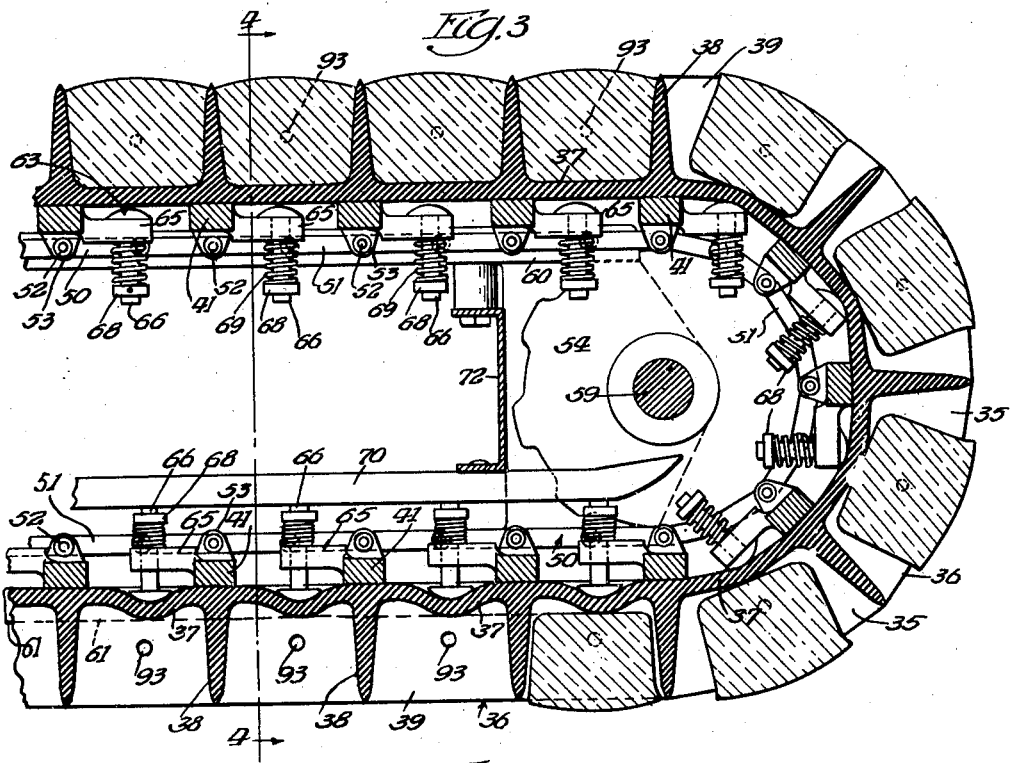
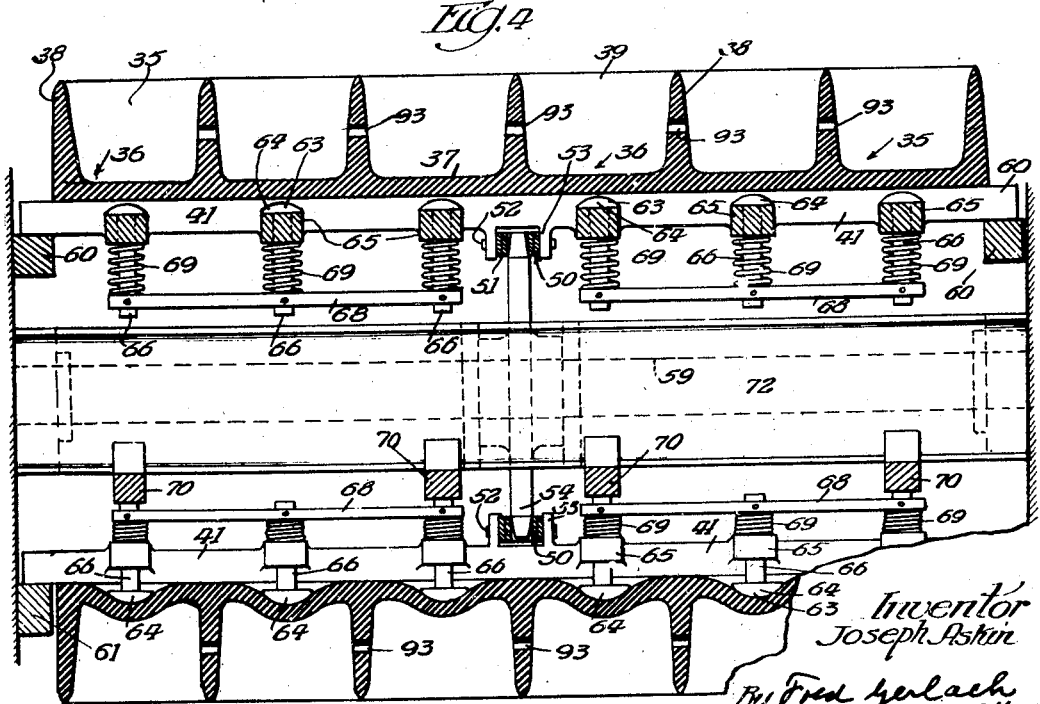

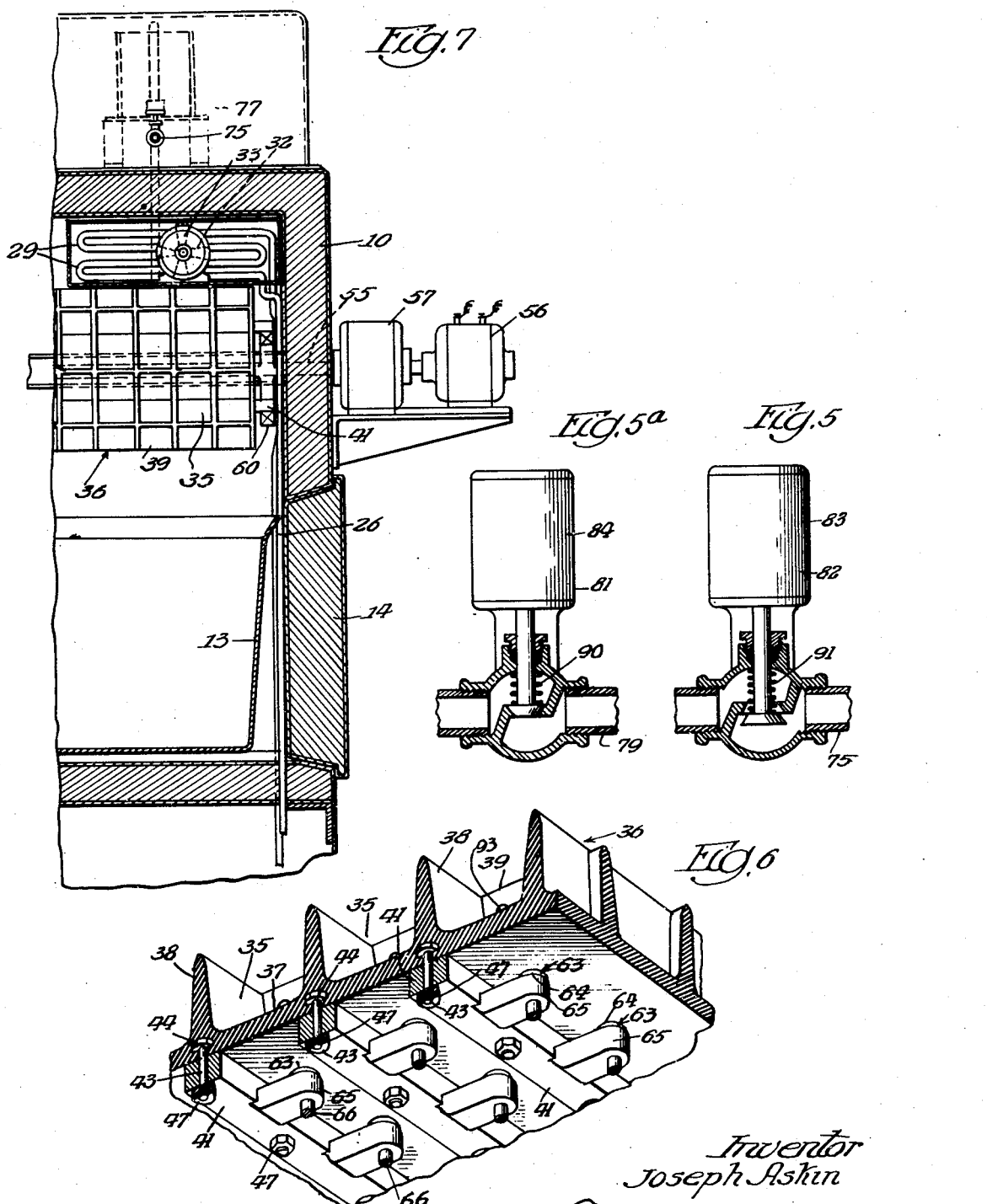

2,487,408

UNITED STATES PATENT OFFICE 2,487,408

APPARATUS FOR FREEZING ICE CUBES

Joseph Askin, Marion, Ind., assignor to Peerless of America, Inc., Chicago, Ill., a corporation of Illinois Application January 20, 1945, Serial No. 573,752

4 Claims. (Cl. 62—2)

The invention relates to apparatus for freezing ice cubes.

One object of the invention is to provide a machine or apparatus for freezing ice cubes which has a high capacity.

Another object of the invention is to provide apparatus which is automatic in its operation and adapted to operate continuously for freezing ice cubes.

Another object of the invention is to provide an apparatus for freezing ice cubes which is provided with means for automatically controlling the supply of water to deliver a predetermined volume in each of the freezing cells.

A still further object of the invention is to provide apparatus for freezing ice cubes which comprises an elastic belt provided with rows of cells with means for automatically discharging the frozen cubes from the cells.

Other objects of the invention will appear from the detailed description.

The invention consists in the several novel features hereinafter described and more particularly defined by claims at the conclusion hereof.

In the drawings, Fig. 1 is a vertical longitudinal section of a machine or apparatus exemplifying the invention.

Fig. 2 is a perspective of the switch for controlling the electro-magnetically operable valves for controlling the supply of water to the measuring tank and from the measuring tank into the cells in the elastic belt.

Fig. 3 is a longitudinal section on an enlarged scale of a portion of the endless elastic belt and the devices for discharging the frozen cubes from the belt.

Fig. 4 is a section taken on line 4—4 of Fig. 3.

Fig. 5 is a section of the electro-magnetically controlled valve for controlling the flow of water to the measuring tank.

Fig. 5a is a section of the valve for controlling the flow of water to the freezing cells.

Fig. 6 is a perspective illustrating the devices which are anchored in the endless belt for securing the cross-bars to the belt.

Fig. 7 is a section taken on line 7—7 of Fig. 1.

The invention is exemplified in apparatus comprising a suitable cabinet 10 which is provided with insulating walls and a chamber 11, in the upper portion of which the cubes are frozen and a container 13 removably supported in the lower portion of said chamber into which the frozen cubes are discharged. The container 13 is removable through an opening which is normally closed by door 14. A refrigerating unit is mounted on a suitable base 16 which is supported below the cabinet 11 and comprises an electric motor 17; a compressor 18 for the refrigerant which is driven by a pully 19 on the motor shaft, a belt 20 and a belt wheel 21 on the compressor shaft; a condenser 23 for the high pressure refrigerant; a receiver 24 for the refrigerant from the condenser; a pipe 26 connected to the receiver, a suitable expansion valve 27; an evaporating coil 29 connected to pipe 26, and a pipe 30 for conducting the spent refrigerant from coil 29 to the compressor. This refrigerating unit may be of any suitable construction, as well understood in the art. Coil 29 is disposed in the upper portion of freezing chamber 11 and a fan 32 driven by an electric motor 33 is supported in the cabinet to force air across the upper portion of the freezing chamber 11, and between the pipes of coil 29 to accelerate freezing of the cubes.

The cubes are frozen in cells 35 of an endless elastic belt 36. Said belt comprises an endless base web 37, walls 38 and transverse walls 39 which extend cross-wise of the longitudinal walls 38 to form a series of cells each of which is adapted to form an ice cube. The web 37 and walls 38 and 39 of the belt are formed of suitable elastic material, such as rubber or rubber substitutes and are integrally formed with one another. Cross-bars 41 extend transversely across the inner face of the web 37 of belt 36, and are secured to the belt by studs 43 which are provided with heads 44 which are embedded in the elastic material of the belt and shanks which extend through the cross-bars 41, and nuts 47 which secure the cross-bars to the belt. An endless chain 50 comprises links 51 which are pivoted at 52 to lugs 53 on the cross-bars 41. Said chain is supported on and driven by a sprocket wheel 53 at one side of chamber 11 and a sprocket wheel 54 at the opposite side of said chamber. The shaft 55 to which sprocket 53 is secured is continuously driven by an electric motor 56 and speed-reducing gearing 57 which are supported on the outside of cabinet 10. Sprocket 54 is supported by a shaft 59. A structure for guiding and supporting the cross-bars 41 and the endless belt 36 comprises upper stationary horizontal tracks 60 and lower stationary horizontal tracks 61 which terminate adjacent the sprockets 53 and 54 to support and guide bars 41 in the straight reaches between the sprockets. The cells in the belt 36 are loaded with water as hereinafter described which is frozen during the travel of the cells between the sprockets. The cells are loaded adjacent sprocket 53 and the cubes are frozen when they reach the sprocket 54. The frozen cubes are positively discharged from the cells in belt 36 by a series of plungers 63 which are operated to flex the central portion of the base of each cell outwardly as the cubes reach the turn around sprocket 54. Each plunger is slidably mounted in a lug 65 projecting from one of the bars 41 and comprises a convex head 64 adapted to engage the inner face of web 37 of elastic belt 36 and a stem 66 which is slidable through said lug. A series of plungers 63 at each side of the chain 50 are connected together by a bar 68. Springs 69 around stems 66 normally hold the plungers retracted from the belt 36. Tracks 70 are adapted to engage the upper ends of stems 66 of plungers 63 during the travel of cross-bars 41 in the lower reach of the belt 36 to hold the central portions of the base web of the cells flexed for discharging the cubes from the cells. Tracks 70 operate the plungers 63 against the force of springs 69 which retract the plungers during the travel of the bars 41 across upper reach of the travel of elastic belt 36. Tracks 70 are supported by transverse channel beams 72 which are suitably and rigidly supported in the cabinet 10.

The invention provides means for automatically filling transverse rows of cells 35 with water from a suitable source of supply 75. This means comprises a measuring tank 77 which may be mounted on top of the cabinet 10 and is provided with a float controlled valve 78 for automatically cutting off supply of water from pipe 75 when a column of predetermined height is in the tank, which contains sufficient volume to fill a transverse row of cells 35. Pipe 75 is connected to deliver water to valve 78 and the tank 77 is connected to discharge water into a pipe 79 which discharges the water into the central cells of a transverse row over the sprocket 35. The flow of water from tank 77 to pipe 79 is controlled by a solenoid valve 81 and the flow of water from the supply pipe 75 to flow control valve 78 is automatically controlled by a solenoid valve 82. The solenoids 83 and 84 of valves 81 and 82 respectively are connected to an electric circuit 85 as illustrated in Fig. 1. Circuit 85 includes a normally open switch 86 which is stationarily mounted in the cabinet and is adapted to be closed by a contactor 87 on each of the cross-bars 41. Valve 81 is held normally closed by a spring 90 and is opened when solenoid 83 is energized by the closing of switch 86 to cause water to flow from tank 75 to the cells 35 of the elastic belt 36. Valve 82 is held normally open by a spring 91 and is adapted to be closed when magnet 84 is energized as the result of the closing of switch 86.

The operation of the apparatus is as follows:
The refrigerating unit operates to maintain a temperature in chamber 11 of the desired degree for freezing and is thermostatically controlled to maintain said temperature as well understood in the art. The belt 36 is continuously driven by the motor 56 and speed reducing mechanism 57, shaft 55, and sprockets 53. The fan 32 is continuously operated to distribute air from the evaporating coil 29 over the upper reach of the elastic belt 36. Normally open valve 82 admits water from pipe 75 to valve 78 which is closed by its float when the tank 77 contains a predetermined volume of water sufficient to fill one transverse row of cells 35 in the endless belt 36. When contact plate 87 closes switch 86, valve 81 will be opened by solenoid 83 and simultaneously valve 82 will be closed by solenoid 84. The measured volume of water in tank 77 will then be discharged into said row of cells. Openings 93 are formed in the longitudinal walls 38 of elastic belt 36 to permit the water to flow from the central cells into the remaining cells of the same row. When said row of cells has been filled, contact place 87 will release switch 86 and interrupt the electrical circuit 85 to cause spring 90 to close valve 81 and spring 91 to open valve 82. During the next cycle and before switch 86 is again opened, water will flow from supply pipe 75 through valve 91 into tank 77 until valve 78 is closed by its flow. This cycle of operation will be repeated for each transverse row of cells 35 in the elastic belt 36. A vent pipe 100 is connected to pipe 79 to permit water to drain from pipe 79 so that there will be no residue in its lower end which might freeze to clog the pipe. During the travel of the filled cells, the cubes will be frozen before they reach the turn around sprocket 54. During the travel of the elastic belt 36 across its upper reach the plungers 63 will be retracted by springs 69 and the web 37 of the elastic belt will remain flat or in its normal position. During the travel of the belt 36 around sprocket 54, it will be flexed or stretched and deformed to loosen the cubes more particularly from the transverse walls of the cells as illustrated in Fig. 3. During the travel of the cubes around sprocket 54, the plungers 63 will support the central portions of the cells and cause the intermediate portions to deform or flex. As the bars 41 commence to travel in the lower reach of the elastic belt 36, plungers 63 in successive transverse rows will be forced downwardly against the force of the springs 69 so that the central portion of the web of each cell will be flexed to forcibly loosen the cubes in the cell and to discharge them therefrom into the container 13. This cycle of operations will be repeated for the cubes frozen in each transverse row of cells 35. The operation of the refrigeration unit is preferably controlled to freeze the cubes and to maintain temperature below 32 degrees at which the cubes in the container 13 will not freeze together. The control system for delivering water to the sills, and the ejecting devices, are controlled by the continuous movement of the belt. The freezing of the cubes is effected in the cells in the upper reach of the belt, during the continuous movement thereof.

The invention exemplifies apparatus for freezing ice cubes which is continuously operated and has a high capacity of production. The endless belt of elastic material facilitates the loosening and discharge of the cubes from the cells in which they are frozen. The water delivered into the cells is measured for the cells and its delivery thereto is automatically timed and controlled while the cells are continuously advanced across the freezing chamber.

The apparatus is simple in construction and efficient in operation.

The term "cubes" as used herein is to be understood as comprehending blocks of various shapes and not to the blocks which are strictly cubical in contour.

The invention is not to be restricted to the details described since these may be modified within the scope of the intended claims without departing from the spirit and scope of the invention.

Having thus described the invention, what I claim as new and desire to secure by Letters Patent is:

1. Apparatus for freezing ice cubes, comprising: a cabinet provided with a closed freezing chamber, an endless element provided with cells, in the freezing chamber and completely enclosed by the cabinet, means for continuously moving the element, a measuring tank for water, located on the outside of the cabinet, means for conducting water from the tank into groups of cells in succession, valve means for controlling the flow of measured quantities of water from the tank into the cells, and automatic means for controlling the valve means to alternately charge the tank and discharge water from the tank into the cells.

2. Apparatus for freezing ice cubes, comprising: a cabinet provided with a closed freezing chamber, an endless element provided with cells, in the freezing chamber and completely enclosed by the cabinet, means for continuously moving the element, a measuring tank for water, located on the outside of the cabinet, and means for conducting water from the tank into groups of cells in succession, valve means for controlling the flow of measured quantities of water from the tank into the cells, electro-magnetic means for operating the valve means and means controlled by the movement of the belt to alternately charge the tank and discharge water from the tank into the cells.

3. Apparatus for freezing ice cubes, comprising: a cabinet provided with a closed freezing chamber, an endless element in the freezing chamber provided with cells, an evaporator coil disposed in said chamber, enclosed by the cabinet and disposed above one end of the endless element, means for continuously driving the element, means for delivering water in measured quantities into the cells in succession, and means in the cabinet for impelling air around the coil and longitudinally over the tops of the loaded cells of the endless element.

4. Apparatus for freezing ice cubes, comprising: a cabinet provided with a closed freezing chamber, an endless elastic belt provided with transverse rows of cells having elastic walls including elastic bottoms, rotatable means for supporting the belt to travel in substantially straight upper and lower reaches, a driven chain attached to the belt, for continuously driving the belt, mechanism for delivering water successively in measured quantities into the rows of cells; devices mounted on and to travel with the belt, for flexing the bottom walls, stationarily mounted cam means for successively operating said devices to eject the cubes and extended to retain the bottom walls in the lower straight reach flexed.

JOSEPH ASKIN.

REFERENCES CITED

The following references are of record in the file of this patent:

UNITED STATES PATENTS

| Number | Name | Date |
| --- | --- | --- |
| 1,857,122 | Sherman | May 3, 1932 |
| 1,924,988 | Grayson | Aug. 29, 1933 |
| 2,026,227 | Foracker | Dec. 31, 1935 |
| 2,054,101 | Short | Sept. 15, 1936 |
| 2,058,077 | Greenwald | Oct. 20, 1936 |
| 2,182,454 | Sherman | Dec. 5, 1939 |
| 2,364,559 | Storer | Dec. 5, 1944 |
| 2,431,916 | Caesar | Dec. 2, 1947 |
| 2,432,597 | Toulmin | Dec. 16, 1947 |